March 15, 1960
J. R. JOHNSON
2,928,521
APPARATUS FOR ARRANGING IRREGULARLY SHAPED GLASS CONTAINERS
Filed Sept. 23, 1957
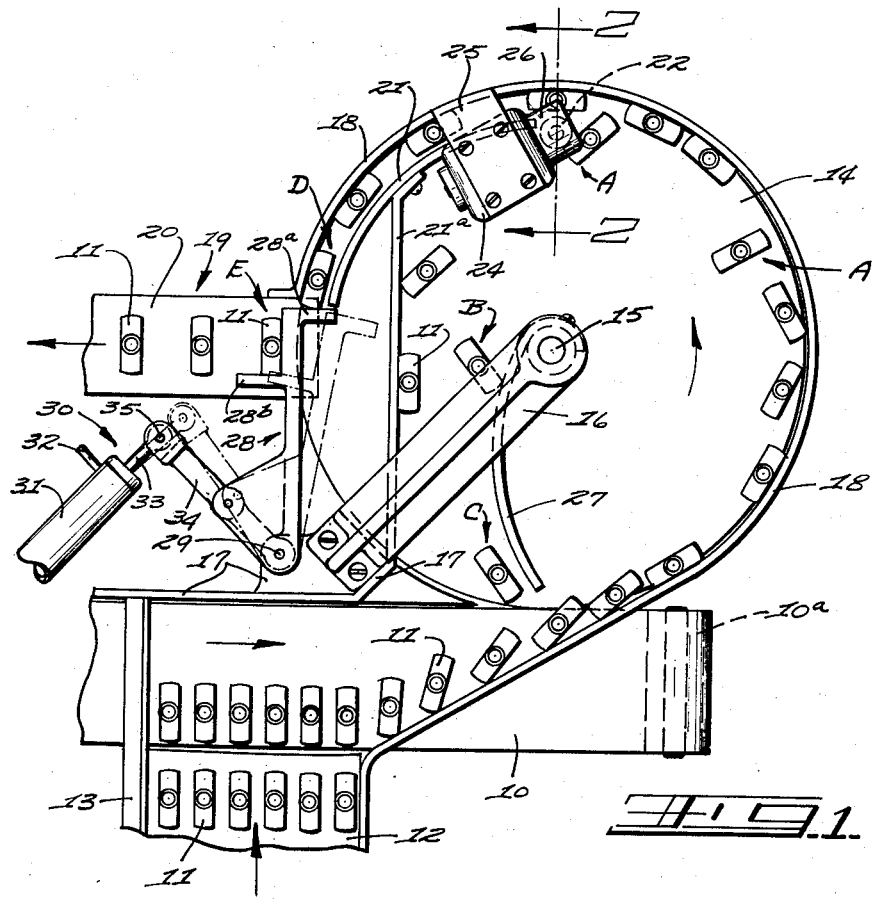
INVENTOR
John R. Johnson
BY J. R. Nelson
W. A. Schaich
ATTORNEYS United States Patent Office 2,928,521
Patented Mar. 15, 1960

2,928,521

APPARATUS FOR ARRANGING IRREGULARLY SHAPED GLASS CONTAINERS

John R. Johnson, Toledo, Ohio, assignor to Owens-Illinois Glass Company, a corporation of Ohio Application September 23, 1957, Serial No. 685,642

6 Claims. (Cl. 198—33)

The present invention relates to improved apparatus or mechanism for transforming a massed arrangement of containers, such as glass bottles, delivered by a first conveyor into a single file arrangement on a second conveyor, and more particularly to apparatus for handling containers that are non-uniform in their horizontal cross-sectional dimensions, such containers being hereinafter referred to as irregularly shaped containers.

During production of these containers, such as glass bottles, the formed bottles are moved through an annealing lehr in massed relationship and emerge onto a conveyor running across substantially the width of the wide moving lehr conveyor. Prior to packaging the bottles for use by the packaging user, they are imprinted with the users decoration design which is applied by feeding the bottles individually to a supporting cradle on an automatic bottle decorating machine. An example of such a machine is disclosed in my copending application, filed May 27, 1957, Serial No. 661,761. The bottles are fed to the decorating machine by a second conveyor carrying the bottles in single file so that the cradles of the decorating machine travel transversely across the terminal end of this conveyor and a bottle is available for loading into a cradle in properly oriented position as it approaches the point for loading bottles. Each bottle must be presented to the decorating machine in the same oriented position and in properly spaced relationship one to the other to properly feed the decorating machine.

Several forms of apparatus are available for single file feeding of containers, most of them, however, being primarily adapted for handling containers that have uniform cross-sectional dimensions. The conventional form of such apparatus utilizes a rotating horizontal table or disk receiving ware indiscriminately from the first conveyor where it is handled in massed arrangement and carried on the disk until it rides against an arcuate guide rail near the periphery of the table. The bottles are carried along this guide rail in single file and into an entrant opening provided by a radially inwardly spaced guide rail which in combination with the outer guide rail defines a guide path terminating over or adjacent conveyor. The bottles are received at this conveyor in single file and transported elsewhere thereby.

It has been found that these conventional devices are adequate for round bottles or bottles that are regularly shaped, however, bottles that are irregularly shaped, such as rectangularly shaped bottles, during travel to the entrance of the guide path described may be sufficiently out of alignment to engage the innermost guide rail and lodge there causing a jam up and contributing to bottle breakage. To overcome this, it is necessary to station an operator at the table to release the jam ups and occasionally clear the table of broken bottles.

It is, accordingly, an object of the invention to provide apparatus in combination with a rotating table device to automatically and continuously feed irregularly shaped containers in a single file and oriented in like manner from a first to a second conveyor without jam up.

Another object of the invention is an improved article arranging apparatus that continuously arranges the irregularly shaped containers in single file and like orientation and delivers them to a conveyor in equally spaced relationship thereon one to another for feeding them to an automatic decorating machine.

Another object of the invention is to provide an improved article arranging apparatus of simple construction and adaptable for inclusion on existing rotary type article arranging apparatus.

Further objects and advantages of the invention will become apparent from the following detailed description of the drawings on which, by way of preferred example, is presented one form of the invention to best explain its principles and practical adaptation.

On the drawings:

Fig. 1 is a plan view showing the invention being used on a rotary table for receiving, orienting and arranging irregularly shaped bottles and delivering them at equally spaced intervals to a conveyor.

Fig. 2 is a sectional elevational view taken along line 2—2 of Fig. 1.

Referring to Fig. 1, it is seen that a first conveyor belt 10 of a first conveyor is adapted to run endlessly over end pulleys, such as 10a, and receive irregularly shaped containers, such as bottles 11, which are non-uniform in their horizontal length and width dimensions. The bottles 11 are delivered onto conveyor belt 10 from another conveyor, such as a lehr mat 12, whereon the bottles 11 are in a massed arrangement. Along one side of the lehr mat conveyor 12 is an adjustable guide bar 13 which overlies both lehr mat 12 and conveyor belt 10. Adjustable guide bar 13 slides laterally across the end of lehr mat 12 to channel the containers 11 onto the first conveyor belt 10. A rotatable disk 14 has its periphery adjacent conveyor belt 10 and is mounted on a vertical shaft 15 to be driven thereby in a counterclockwise direction (Fig. 1). The vertical shaft 15 is end mounted for rotation, the upper end being journaled in a bracket 16 mounted on the frame of the apparatus, indicated generally at 17. Rotation may be imparted to the vertical shaft 15 through any suitable drive means, such as through a motor and suitable gearing (not shown).

A container guide member 18 is mounted beginning adjacent one side the lehr conveyor mat 12, extends diagonally across the first conveyor mat 10 in overlying relation thereto and around the periphery of disk 14 transcribing an arcuate path over a portion of the periphery of said disk and terminating adjacent the side of a second conveyor, referred to generally at 19. The second conveyor 19 has a conveyor belt 20 traveling in endless fashion from right to left in Fig. 1.

Containers 11 are pushed onto the first conveyor belt 10 by the slowly moving mass of containers carried on the lehr conveyor mat 12. The first conveyor belt 10 then carries the containers against container guide member 18, whereupon they are shifted diagonally across conveyor belt 10 onto the rotating disk 14. The upper surface of the disk 14 is on substantially the same level with the upper surface of the first conveyor belt 10. The disk 14 turns in a counter-clockwise direction and containers received thereon are moved continuously around the arcuate path of guide member 18. Generally, the containers 11 will be carried onto disk 14 so that their horizontal length dimension will lie nearly adjacent or bear against the guide member 18. Occasionally, a container 11 will position itself at an angle to guide member 18, as shown at the containers indicated by A.

At an advanced position along the guide member 18 an internal guide rail 21 is spaced radially inwardly and supported in overlying relationship to disk 14 by a bracket 21a rigidly connected to frame 17. The internal guide rail 21 has a complementary arcuate configuration over its span to correspond to that of guide member 18 so that a parallel guide path is defined between it and the same span of guide member 18. Near the entrance to the guide path at the forward end of internal guide rail 21 is a rotatable wheel 22 mounted on the end of a vertically disposed shaft 23 driven by an electric motor 24. The electric motor 24 is mounted on a bracket 25 integral with the container guide member 18 and supported on the frame 17. The electric motor is gear connected to the vertical shaft 23 through a gear box 26 to provide clockwise rotation to the rotatable wheel 22, when viewed from the above in Fig. 2.

In the general combination presented, the motor 24 drives the wheel 22 in a direction of rotation counter to the rotation imparted to disk 14. On the drawings the disk 14 is rotated counterclockwise and the wheel 22 is rotated clockwise. The outermost periphery of the wheel 22, when viewed in plan as in Fig. 1, is spaced radially inwardly over disk 14 from guide member 18 a distance greater than the horizontal width dimension of the irregularly shaped container 11 but less than the horizontal length dimension of said container. Thus, as the misaligned containers are carried by disk 14, such as a container as indicated by A on Fig. 1, and they are presented to the opening to the guide path at the beginning of internal guide rail 21, they will come into contact with the rotating wheel 22. Due to its counter rotation to the rotation of the disk 14, the wheel 22, upon engaging the side wall of the misaligned container A, will drive this container radially inwardly on disk 14 and avoid a jam up at the entrance to the guide path. This container, when carired out of the way, is transported by the rotating disk to subsequent positions, such as B. A deflector arm 27 is mounted in a fixed position beginning at the center of disk 14 and extending radially outwardly to nearly the periphery of the disk where it terminates to provide an opening along the outer edge of the disk for a container, such as indicated at C, to re-enter the line of containers along the guide member 18 and permit passage of it between the outer end of arm 27 and the periphery of disk 14.

As containers are oriented lengthwise along the guide member 18 and aligned to pass by the rotating wheel 22 and into the guide path between member 18 and guide rail 21, they arrive at the terminal end of the said guide path ready for feeding onto the second conveyor 20. At this point a feeder arm 28 is pivoted on frame 17 at a pivot pin 29 to oscillate an outer end portion 28a across the terminal end of the guide path and thereby alternately open and close it. Feeder arm 28 overlies disk 14 so that when arm 28 is pivoted to the left (solid outline in Fig. 1) its outer end portion 28a blocks the guide path opening to engage and retard the advance of the next oncoming container, as indicated by D. When the feeder arm 28 is then pivoted to the right (dotted outline in Fig. 1), the guide path is open and an outward projection 28b on arm 28 is thereupon positioned to receive the next oncoming container, as D, in the proper oriented and aligned position for feeding it to the second conveyor belt 20 and conveyance to the decorating machine. The arm 28 then pivots to the left to shift the container received against projection 28b from disk 14 onto conveyor belt 20 of the second conveyor as indicated, at E, and at the same time block the terminal end of the guide path by end portion 28a. The containers are deposited in a single file with their horizontal lengthwise dimension laterally disposed on the second conveyor 20.

The feeder arm 28 is oscillated in step with the requirements of the decorating machine for loading containers thereto by a fluid actuated cylinder-piston assembly 30. The cylinder 31 is fixed on frame 17. The cylinder-piston assembly 30 may be either single or double acting, or any suitable power means for imparting oscillatory motion to feeder arm 28 may be utilized, such as a rotary power motor driving a cam and having a cam follower carried by the feeder arm. As shown, cylinder-piston assembly 30 is single acting. The piston thereof is actuated in one direction to extend the piston rod 33 by having a spring (not shown) compressed between the outer end of cylinder 31 and the adjacent end of its piston (not shown). Fluid under pressure is intermittently introduced to cylinder 31 at line 32 for imparting movement of the piston in the other direction and retract its piston rod 33. Piston rod 33 is pin connected by pin 35 to a crank arm 34 integral on feeder arm 28. The cylinder-piston assembly 30 is controlled by suitable control means (not shown) to alternately introduce fluid under pressure and exhaust fluid through line 32, such that the piston rod 33 will make one complete cycle of reciprocating movement corresponding to the need for each additional container at the decorating machine. In operation of the power means as shown, the feeder arm 28 is actuated to its dotted position for opening the containers guide path by resilient force acting within the cylinder 31 tending to extend piston rod 33. During this time fluid is permitted to exhaust through line 32. Arm 28 is actuated to its solid outlined position for closing the guide path and simultaneously feeding the next container to the second conveyor by having pressure fluid enter cylinder 31 through line 32 and retract piston rod 33.

As a modification of the above described apparatus, internal guide rail 21 may be eliminated from the structure so that the containers guide path around the latter portion of travel along guide member 18 is defined only at the spacing of the wheel 22 internally along the disk 14 from guide member 18. By so doing, containers that are traveling in aligned position along guide member 18 up to the point of wheel 22 will remain in this same position during their travel along the inner face of guide member 18. However, misaligned containers approaching wheel 22 will be engaged thereby and propelled by its counter rotation inwardly on disk 14 for recirculation as aforesaid. Any tendency of the containers which are propelled inwardly by wheel 22 to interfere with containers being fed by the feeder arm 28 will be prevented by the support 21a or equivalent extending over the operating portion of disk 14 where the containers are being fed onto the second conveyor 19.

Having described one embodiment of the invention and certain modifications thereto, it should be understood that various other modifications may be resorted to without departing from the principle of the invention, which is limited only by the scope of the claims.

I claim:

1. A single file ware feeder device for feeding containers that are non-uniform in horizontal cross-sectional dimensions from a first conveyor into a single file on a second conveyor comprising the combination of a horizontally disposed rotatable disk having its periphery adjacent each said first and second conveyors and adaptable for rotation in a direction to transport containers received from said first conveyor to said second conveyor, a container guide member describing an arcuate path and beginning over said first conveyor, extending over said disk, and terminating adjacent said second conveyor, a rotatable wheel mounted on a vertical shaft, said wheel extending above said disk and capable of engaging a container carried thereon, the periphery of said wheel being spaced horizontally inwardly along the disk from said guide member and operable so that its periphery is at a predetermined constant distance therefrom that is greater than one container width but less than one container length, individual power means for imparting rotation to said wheel in a direction counter to the rotation of said disk, said rotating wheel assuring a single file arrangement of containers along said container guide member, means for feeding containers from the terminal end of said container guide member to said second conveyor and at equally spaced intervals, said means comprising an oscillatory feeder arm pivotally mounted to extend inwardly across the terminal end of said guide member to receive a container, and reciprocating power means operatively connected to oscillate said arm, thereby successively transferring containers from said disk to said second conveyor.

2. The combination of a rotating table for receiving and conveying containers that are non-uniform in horizontal cross-section, guide means overlying the table and extending around the table in a substantially arcuate path for guiding containers carried by the table to a point of unloading, a conveyor adjacent said point of unloading, an independently power driven rotating wheel mounted for rotation about a vertical axis in a direction counter to the direction of rotation of the rotating table and overlying the said table, the wheel being spaced radially inwardly across the said table from the guide means a distance greater than the width of the container but less than its length to permit passage only of containers therebetween that are aligned lengthwise along their longitudinal dimensions and in single file, and engage misaligned containers to impel them radially inwardly on said table, thereby preventing misalignment of containers in the single file upon unloading, and means for feeding containers from adjacent guide means at the point of unloading to the conveyor in oriented relationship and at equally spaced intervals, said means being operable in oscillatory fashion to control the spacing and orientation of said containers passing from the unloading point onto the conveyor.

3. The combination of a rotating table adapted to receive and convey containers, guide means extending above said table and defining a substantially arcuate path around the table for guiding containers carried by the table to a point of unloading, and means for feeding containers from adjacent the guide means at the point of unloading to the conveyor and at equally spaced intervals, said means being operable in oscillatory fashion to control the spacing and orientation of said containers passing from the unloading point onto the conveyor.

4. The combination of a rotating table adapted to receive and convey containers, guide means extending above said table and defining an arcuate path around the table for guiding containers carried by the table to a point of unloading, and means for feeding containers from said point of unloading to an adjacent conveyor and at equally spaced intervals, said means comprising an oscillatory feeder arm pivotally mounted to align with the terminal end of the guide means and adapted to intercept containers traveling in single file along said guide means, and reciprocating power means operatively connected to oscillate said arm at a predetermined rate for successively intercepting containers at the terminal end of said guide means and placing them in spaced and oriented relationship onto the conveyor.

5. The combination of a rotating table adapted to receive and convey containers, guide means extending above said table and defining an arcuate path around the table for guiding containers carried by the table to a point of unloading, an internal guide means spaced radially inwardly from said first mentioned guide means and in overlying relationship to the table, said spacing being sufficient for passage of containers in single file relationship between it and said first mentioned guide means, thereby defining a guide path terminating at the unloading point, an adjacent unloading conveyor and means for feeding containers from adjacent the terminal end of the guide path to the unloading conveyor and at equally spaced intervals, said means comprising an oscillatory feeder arm pivotally mounted to align with the terminal end of the guide path and adapted to open and close across said terminal end of the guide path, and reciprocating power means operatively connected to oscillate said arm at a predetermined rate for opening and closing said guide path to feed the said containers in a controlled spaced relationship from the table to the unloading conveyor.

6. The combination of a rotating table for receiving and conveying containers, guide means overlying the table and extending around the table in an arcuate path for guiding containers carried by the table to a point of unloading, an independently power driven rotating wheel mounted for rotation about a vertical axis in a direction counter to the direction of rotation of the rotating table and overlying said table, the wheel being spaced radially inwardly across the said table from the guide means a distance greater than the width of the container to permit passage only of containers therebetween aligned in single file and engage misaligned containers to impel them radially inwardly on said table, a conveyor means for feeding containers from adjacent the terminal end of the guide path to the conveyor and at equally spaced distances, comprising an oscillatory feeder arm pivotally mounted to align with the terminal end of the guide path and adapted to open and close said terminal end of the guide path by movement thereacross, and reciprocating power means operatively connected to oscillate said arm at a predetermined rate, thereby opening and closing said guide path to control the spacing of said containers passing therefrom and deliver them onto the conveyor.

References Cited in the file of this patent
UNITED STATES PATENTS

| 2,047,106 | Lidberg | July 7, 1936 |
| 2,642,173 | Wehmiller | June 16, 1953 |
| 2,737,286 | Kibler | Mar. 6, 1956 |